(12) United States Patent
Jeon et al.

(10) Patent No.: US 10,233,373 B2
(45) Date of Patent: Mar. 19, 2019

(54) DRILLING OIL AND METHOD OF PREPARING THE SAME

(71) Applicants: SK INNOVATION CO., LTD., Seoul (KR); SK GLOBAL CHEMICAL CO., LTD., Seoul (KR)

(72) Inventors: Hee Jung Jeon, Daejeon (KR); Ja Hyun Yang, Daejeon (KR); Tae Jin Kim, Seoul (KR); Young Hwan Lee, Daejeon (KR); Jong Chan Lee, Sejong (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

(21) Appl. No.: 15/882,497

(22) Filed: Jan. 29, 2018

(65) Prior Publication Data

US 2018/0194983 A1 Jul. 12, 2018

Related U.S. Application Data

(63) Continuation of application No. 14/786,003, filed as application No. PCT/KR2014/003569 on Apr. 23, 2014, now Pat. No. 9,879,169.

(30) Foreign Application Priority Data

Apr. 23, 2013 (KR) .................. 10-2013-0044558

(51) Int. Cl.
*C09K 8/035* (2006.01)
*C09K 8/34* (2006.01)
*C11C 3/12* (2006.01)
*C11C 3/08* (2006.01)

(52) U.S. Cl.
CPC ............ *C09K 8/035* (2013.01); *C09K 8/34* (2013.01); *C11C 3/08* (2013.01); *C11C 3/12* (2013.01)

(58) Field of Classification Search
None
See application file for complete search history.

(56) References Cited

U.S. PATENT DOCUMENTS

| 5,198,012 A | 3/1993 | Iwasaki |
| 6,054,415 A | 4/2000 | Gee et al. |
| 2003/0211949 A1 | 11/2003 | Guyomar et al. |
| 2005/0054539 A1 | 3/2005 | Patel et al. |

(Continued)

FOREIGN PATENT DOCUMENTS

| CN | 101326267 | 12/2008 |
| CN | 102131751 | 7/2011 |
| CN | 105189716 | 12/2015 |

OTHER PUBLICATIONS

International Search Report dated Aug. 25, 2014 for corresponding international patent application No. PCT/KR2014/003569.

(Continued)

*Primary Examiner* — John J Figueroa
(74) *Attorney, Agent, or Firm* — Abelman, Frayne & Schwab

(57) ABSTRACT

Embodiments of the present invention relate to drilling oil, and to a method of preparing the drilling oil, including converting C16 and/or C18 fatty acids derived from fat of biological origin into C15 and/or C17 olefins through decarbonylation.

5 Claims, 7 Drawing Sheets

(56) References Cited

U.S. PATENT DOCUMENTS

| | | |
|---|---|---|
| 2005/0277551 A1 | 12/2005 | Massam |
| 2007/0142234 A1* | 6/2007 | Mueller .................. C09K 8/34 507/267 |
| 2007/0287636 A1 | 12/2007 | Heller et al. |
| 2011/0251445 A1 | 10/2011 | Takeuchi et al. |
| 2012/0108861 A1 | 5/2012 | Roberts, IV et al. |
| 2012/0283151 A1 | 11/2012 | Espagne et al. |

OTHER PUBLICATIONS

Liu, Yanyong et al. "Hydrotreatment of vegetable oils to produce bio-hydrogenated diesel and liquefied petroleum gas fuel over catalysts containing sulfided Ni—Mo and solid acids." Energy & Fuels. 2011, vol. 25, No. 10, pp. 4675-4685.

Huber, George W. et al. "Synergies between bio and bil refineries for the production of fuels from biomass." Angewandte Chemie International Edition. 2007, vol. 46, No. 38, pp. 7184-7201.

Supplemental European Search Report dated Aug. 24 2016 for corresponding European patent application No. EP14787836.

Gong, Shaoffeng et al. "Hydrotreating of Jatropha Oil over Alumina Based Catalysts." Energy & Fuels., vol. 26, No. 4, Apr. 19, 2012, pp. 2394-2399.

Office Action dated Aug. 2, 2017 for corresponding Chinese patent application No. 201480031446.9.

* cited by examiner

DRILLING OIL AND METHOD OF PREPARING THE SAME

CROSS REFERENCE TO RELATED APPLICATIONS

This application is a continuation of U.S. application Ser. No. 14/786,003, filed Oct. 21, 2015, which is a national phase of PCT application No. PCT/KR2014/003569, filed Apr. 23, 2014, which claims priority to KR patent application No. 10-2013-0044558, filed Apr. 23, 2013, all of which are incorporated herein by reference thereto.

TECHNICAL FIELD

The present invention relates to drilling oil and a method of preparing the same, and more particularly, to drilling oil containing olefin derived from biomass of biological origin and to a method of preparing the same.

BACKGROUND ART

Although oil energy has led the development of human society, it suffers from problems including finiteness of resources, regional disparities, environmental pollution, etc., and thus thorough research into fully/partially replacing oil resources with biomass is ongoing.

The term "biomass" broadly refers to any material of biological origin, and narrowly refers to a material mainly derived from plant sources such as corn, soybeans, linseed, sugar cane and palm oil, and may extend to all living organisms, or by-products of metabolism which is part of a carbon cycle.

Research into production of high-value-added materials from biomass has been extensively and intensively carried out since the 1970s, but commercially applicable independent models have not yet been presented. This is considered to be due to some defects of biomass: First, biomass resources are limited. Although too much emphasis is given to oil resources, they are currently present in amounts able to satisfy global demand for energy and chemicals. Compared to oil resources, biomass, on which less emphasis is laid, requires additional production procedures and is thus produced at a much lower level. Second, biomass has low price competitiveness. Because biomass is basically produced on the premise of consumption, cheap surplus biomass is difficult to find as a feed for replacing the oil resources. Third, there is difficulty in ensuring that a sufficient amount of biomass is available. Whereas oil resources are produced from preexisting oil blocks in specific areas and thus have no problems of additionally yielding resources, biomass typically requires a large area under cultivation and thus it is difficult to ensure produced biomass in a large enough amount to serve as a resource to replace oil.

However, techniques for overcoming the above limitations with improvements in biomass production are being provided. In particular, CPO (Crude Palm Oil) and SBO (Soybean Oil) presented as surplus biomass are globally produced in an amount of millions of tons, and the amount able to be ensured on the open market is approximately 1 million tons or more. Furthermore, as the production amount thereof increases, price volatility becomes lower than before, and purchase on the open market becomes possible. Also, because CPO may be ensured in a large amount and its price is stable on the open market, it is receiving attention as an alternative to oil-based products. CPO is composed of 90~95% of triglyceride, and the ratio of C16 and C18 carbon chains of triglyceride is about 45:55 (by weight). A material corresponding to 5~10 wt % that is the remainder of CPO other than triglyceride is composed mainly of C16 and/or C18 fatty acids, containing about 10% of mono- or di-glyceride. Triglyceride, which is selectively separated through refinement of CPO, is referred to as RBD (Refined Bleached Deodorized) palm oil. As such, about 5~10 wt % of fatty acid and mono- or di-glyceride, which were removed, may be referred to as PFAD (Palm Fatty Acid Distillate). Currently, the amount of CPO which may be purchased on the open market is approximately 1 million tons, and the amount of PFAD is approximately 4 hundred thousand tons. In this regard, fatty acids, which constitute triglyceride and PFAD, are illustrated in FIG. 1. Also, carbon branches for CPO and PFAD are shown in Table 1 below.

TABLE 1

| Fatty acid | CPO[1] (wt %) | PFAD[2] (wt %) |
| --- | --- | --- |
| 14:0 Myristic | 0.5~5.9 | 0.9~1.5 |
| 16:0 Palmitic | 32~59 | 43~51 |
| 16:1 Palmitoleic | <0.6 | — |
| 18:0 Stearic | 1.5~8.0 | 4~5 |
| 18:1 Oleic | 27~52 | 33~40 |
| 18:2 Linoleic | 5.0~14 | 9~11 |
| 18:3 Linolenic | <1.5 | 0.2~0.6 |
| 20:0 Eicosanoic | <1.0 | — |

[1]composed mainly of triglyceride
[2]composed mainly of fatty acid

Meanwhile, drilling oil, which is called drilling fluid, boring mud, mud, drilling mud, etc., is transported under pressure to a drill bit through the center of a drill pipe upon drilling and then sprayed through a nozzle provided to the drill bit. As such, when the drilling oil pushes out rock cuttings and is recovered in the ground through a space between the hole wall and the drill pipe, the cuttings are discharged together. Such drilling oil functions (i) to remove rock cuttings, (ii) to cool the drill bit and the drill pipe, (iii) to lubricate the drill pipe, and (iv) to prevent collapse of the wall of a drill well due to back reaction to the borehole infrastructure pressure created in the course of drilling.

The drilling oil may be largely classified into oil-based and synthetic-based. The former indicates drilling oil containing no synthetic material, and includes diesel oil, mineral oil or other oil. Whereas, the latter indicates drilling oil prepared by reaction of a specifically refined chemical, and for example, may be oil synthesized by oligomerization of one or more olefin monomers in the presence of a metallocene catalyst (U.S. Pat. Nos. 5,198,012 and 6,054,415, and US Publication No. 2011/0251445). In this regard, a conventionally commercially available Chevron blend is prepared through a full range of linear α-olefin technology, and the drilling oil comprises a mixture of 1-hexadecene (C16) and 1-octadecene (C18), and the ratio of C16/C18 α-olefins is about 65/35.

The drilling oil has to satisfy specific properties in consideration of essential required functions. For example, density (specific gravity) is a property which enables a fluid column to exhibit a characteristic similar to lithostatic stress in ice depending on changes in the drilling depth. In the case where the pour point of the drilling oil is high, the viscosity of the drilling oil is drastically increased under low-temperature conditions (upon deep-sea drilling, oil drilling in the Polar Regions, etc.), and also excessive thickening may occur. Also, the case where the flash point of the drilling oil is low may incur stability problems. In addition, when the drilling oil has too low viscosity, it is impossible to exhibit the inherent function thereof which allows the cuttings to float and be transported to the surface. In contrast, when the viscosity is too high, pumping of the drilling oil becomes difficult. Hence, the viscosity of the drilling oil has to be adjusted appropriately. However, such properties counteract each other (e.g. when any one property increases, another property may deteriorate), and thus it is difficult to simultaneously satisfy the properties required of the drilling oil alone.

Also, as the drilling work conditions and the regulations for environmental pollution are enhanced, drilling oil is required not only to exhibit its inherent function but also to prevent the generation of problems to people and the environment. However, in conventional techniques, limitations are imposed on minimizing the environmental effects, such as biodegradability and/or toxicity. For example, oil-based drilling oil inevitably contains polycyclic aromatics, transition metals, sulfur, nitrogen, halogen, etc., as impurities present in crude oil, and thus additional equipment or processing for removing such impurities should be provided. Also, synthetic-based drilling oil, especially an oligomerization product of olefin, has the potential problem in which the catalyst (e.g. boron trifluoride, etc.) used for the reaction may be discharged as a toxic material. Particularly with the EPA (Environmental Protection Agency) in the USA, regulations for biodegradability, sediment toxicity, heavy metal and polycyclic aromatic contents have become stricter.

In this regard, methods of manufacturing fuel oil such as gasoline or diesel from biomass are conventionally known, but applicability of biomass to drilling oil is not. Biomass contains few components which cause environmental pollution, and is composed exclusively of carbon, hydrogen and oxygen and is thus regarded as favorable in terms of preventing environmental pollution. Moreover, in order to fulfill the increasing demand of crude oil, drilling works are frequently carried out in cold regions and the demand in improving low-temperature properties (especially, pour point) is also increasing. Furthermore, there is still a need to improve fundamental properties (flash point, specific gravity, viscosity, etc.) of drilling oil.

DISCLOSURE OF INVENTION

Technical Problem

Accordingly, the present invention has been made keeping in mind the above problems occurring in the related art, and an embodiment of the present invention is to provide eco-friendly biomass-derived drilling oil having properties equal or superior to those of conventional drilling oil, and a different reaction route for preparing the same.

Solution to Problem

In accordance with a first aspect of the present invention, drilling oil includes mixed C15 and C17 linear olefins, wherein a weight ratio of C15 linear olefin to C17 linear olefin is 99:1~1:99, a weight ratio of internal olefin (LIO) relative to the sum of α-olefin (LAO) and internal olefin (LIO) of the mixed C15 and C17 linear olefins is at least 0.1, and the drilling oil has (i) a flash point of 85° C. or more, (ii) a pour point of less than −5° C., (iii) a density of 0.77~0.81 g/cm$^3$, and (iv) a kinematic viscosity of 1.9~3.5 cSt (40° C.).

In an embodiment, the mixed C15 and C17 linear olefins may contain at least 10 wt % of a polyolefin having two or more double bonds.

In an embodiment, the amount of the mixed C15 and C17 linear olefins in the drilling oil may be at least 80 wt %.

In accordance with a second aspect of the present invention, a method of preparing drilling oil includes providing mixed C16 and C18 fatty acids derived from biomass; and subjecting the mixed fatty acids to decarbonylation so as to be converted into mixed C15 and C17 linear olefins, wherein a weight ratio of C15 linear olefin to C17 linear olefin is 99:1~1:99, a weight ratio of internal olefin (LIO) relative to the sum of α-olefin (LAO) and internal olefin (LIO) of the mixed C15 and C17 linear olefins is at least 0.1, and the drilling oil has (i) a flash point of 85° C. or more, (ii) a pour point of less than −5° C., (iii) a density of 0.77~0.81 g/cm$^3$, and (iv) a kinematic viscosity of 1.9~3.5 cSt (40° C.).

In an embodiment, providing the mixed C16 and C18 fatty acids comprises providing biomass-derived fat; and subjecting triglyceride in the biomass-derived fat to de-esterification, thus providing converted mixed C16 and C18 fatty acids, mixed C16 and C18 fatty acids present in the biomass-derived fat, or a combination thereof.

In accordance with a third aspect of the present invention, a method of preparing drilling oil includes providing biomass-derived fat; subjecting triglyceride in the biomass-derived fat to de-esterification, thus providing converted mixed C16 and C18 fatty acids, mixed C16 and C18 fatty acids present in the biomass-derived fat, or a combination thereof; individually separating a C16 fatty acid and a C18 fatty acid from the mixed C16 and C18 fatty acids; and subjecting the separated C16 fatty acid or C18 fatty acid to decarbonylation so as to be converted into a C15 linear olefin or a C17 linear olefin, wherein a weight ratio of internal olefin (LIO) relative to the sum of α-olefin (LAO) and internal olefin (LIO) of the mixed C15 and C17 linear olefins is at least 0.1, and the drilling oil has (i) a flash point of 85° C. or more, (ii) a pour point of less than −5° C., (iii) a density of 0.77~0.81 g/cm$^3$, and (iv) a kinematic viscosity of 1.9~3.5 cSt (40° C.).

Advantageous Effects of Invention

According to embodiments of the present invention, drilling oil, including biomass-derived C15 and C17 linear olefins or mixtures thereof, has α-olefin and internal olefin at an appropriate ratio in the olefins, thereby exhibiting improved properties (especially low-temperature characteristics) compared to conventional oil-based and synthetic-based drilling oil, and superior characteristics associated with biodegradability/toxicity. Furthermore, when using a new reaction route as represented in the present embodiment, the reaction (e.g. decarbonylation) conditions are adjusted, and thus the position and/or number of double bonds in the olefins can be controlled, so that the drilling oil can manifest desired properties even when using any biomass. Also, depending on the kind of biomass (fatty acid composition of biomass fat), drilling oil having various properties can be produced. Hence, the present invention is expected to have wide applications henceforth.

BEST MODE FOR CARRYING OUT THE INVENTION

The present invention may be embodied by the following description with reference to the appended drawings. The following description is to understand preferred embodiments of the present invention, and the present invention is not necessarily limited thereto.

The terms used herein may be defined as follows.

The term "linear olefin" refers to a linear (i.e. non-branched) hydrocarbon having at least one double bond in a chain thereof.

The term "α-olefin" refers to an olefin having a double bond at the terminal position of a chain thereof, and the term "internal olefin" refers to an olefin having a double bond at the non-terminal position of a chain thereof.

According to an embodiment of the present invention, drilling oil includes fatty acids converted from triglyceride contained in biomass, that is, biomass fat, and/or C15 and C17 linear olefins or mixtures thereof derived from fatty acids contained in biomass fat.

Figure 1:
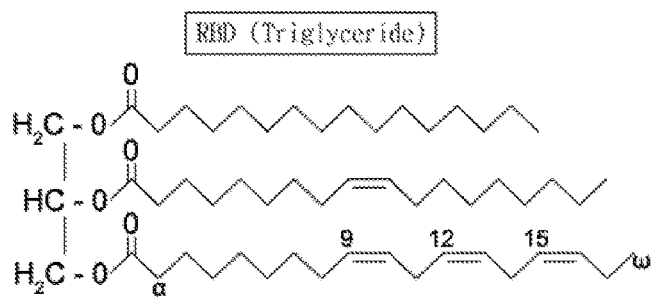
FIG. 1 illustrates chemical formulas of triglyceride and fatty acid contained in typical CPO (Crude Palm Oil)
Figure 1:
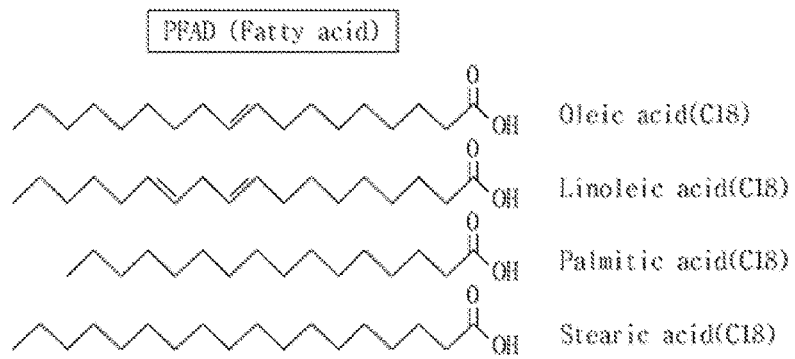
Figure 2:
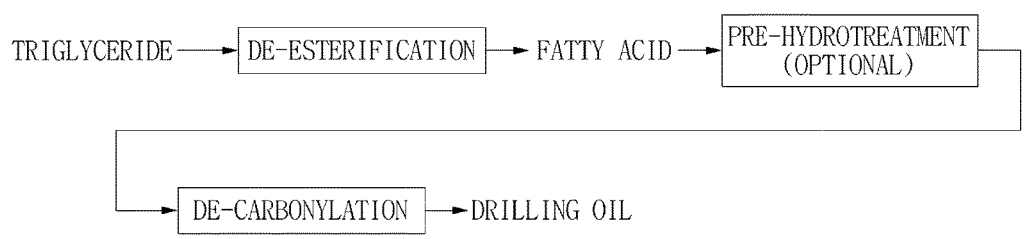
FIG. 2 schematically illustrates a series of procedures of producing drilling oil from triglyceride contained in biomass fat according to an exemplary embodiment of the present invention.

FIG. 2 schematically illustrates a series of procedures of preparing drilling oil from triglyceride contained in biomass fat according to an exemplary embodiment of the present invention.

As illustrated in this drawing, fatty acid preparation through de-esterification of triglyceride, pre-hydrotreatment as an optional step, and decarbonylation are sequentially performed. The decarbonylation conditions are adjusted depending on the characteristics of the fatty acids, whereby the position of the double bond in the produced olefin may be controlled. Thus, even when any biomass-derived fatty acid is used as a feed, the drilling oil may be prepared reproducibly while satisfying the requirements.

Preparation of Biomass-Derived Fatty Acid

According to an embodiment of the present invention, fatty acids may be obtained from various animal and plant fat components known in the art. The animal components may be exemplified by fish oil, cattle oil, lard, sheep oil, butter, etc., and examples of the plant components may include sunflower seed oil, canola oil, coconut oil, corn oil, cottonseed oil, rapeseed oil, linseed oil, safflower oil, oat oil, olive oil, palm oil, peanut oil, apricot kernel oil, almond oil, avocado oil, camellia oil, rice bran oil, walnut oil, rape oil, rice bran oil, flaxseed oil, sesame oil, soybean oil, castor oil, cocoa butter or palm kernel oil.

These components may be used alone or in combination. Also, the present invention is not limited to the species listed above. The kind of biomass usable in the present embodiment, the fatty acids contained therein (or derived therefrom) and the amounts thereof are given in Tables 2 and 3 below.

TABLE 2

| Fatty acid | Soybean oil | Corn oil | Cottonseed oil | Sunflower seed oil | Peanut oil | Olive oil | Rape oil |
| --- | --- | --- | --- | --- | --- | --- | --- |
| 14:0 Myristic | 0.4 | <0.1 | 0.4-2.0 | <0.5 | <0.4 | 0.05 | <1.0 |
| 16:0 Palmitic | 7~14 | 8~9 | 17~31 | 3~10 | 6.0~16 | 7.5~20 | 1.5~6.4 |
| 16:1 Palmitoleic | <0.5 | <0.5 | 0.5~2.0 | <1.0 | <1.0 | 0.3~3.5 | <3.0 |
| 18:0 Stearic | 1.4~5.5 | 0.5~4.0 | 1.0~4.0 | 1.0~10 | 1.3~6.5 | 0.5~3.5 | 0.5~3.1 |
| 18:1 Oleic | 19~30 | 19~50 | 13~44 | 14~65 | 35~72 | 56~83 | 8~45 |
| 18:2 Linoleic | 44~62 | 34~62 | 33~59 | 20~75 | 13~45 | 3.5~20 | 11~29 |
| 18:3 Linolenic | 4.0~11 | <2.0 | 0.1~2.1 | <0.7 | <1.0 | <1.5 | 5~16 |
| 20:0 Eicosanoic | <1.0 | <1.0 | <0.7 | <1.5 | 1.0~3.0 | | <3.0 |
| 20:1 Eicosenoic | <1.0 | <0.5 | <0.5 | <0.5 | 0.5~2.1 | | 3~15 |
| 22:0 Docosanoic | | <0.5 | <0.5 | <1.0 | 1.0~5.0 | | <2.0 |
| 22:1 Erucic | | | | <0.5 | <0.5 | <2.0 | 5~60 |
| 24:0 Tetracosanoic | | <0.5 | <0.5 | <0.5 | 0.5~3.0 | | <2.0 |
| 24:1 Tetracosenoic | | | | <0.5 | | | |

TABLE 3

| fatty acid | Cocoa butter | Palm oil | Palm kernel oil | Coconut oil | Butter | Lard | Cattle oil |
| --- | --- | --- | --- | --- | --- | --- | --- |
| 4:0 Butyric | | | | | 3.6 | | |
| 6:0 Caproic | | | <0.5 | <1.2 | 2.2 | | |
| 8:0 Caprylic | | | 2.4~6.2 | 3.4~15 | 1.2 | | |
| 10:0 Capric | | | 2.6~7.0 | 3.2~15 | 2.8 | | |

TABLE 3-continued

| fatty acid | Cocoa butter | Palm oil | Palm kernel oil | Coconut oil | Butter | Lard | Cattle oil |
|---|---|---|---|---|---|---|---|
| 12:0 Lauric | | <1.2 | 41~55 | 41~56 | 2.8 | | |
| 14:0 Myristic | 0.1 | 0.5~5.9 | 14~20 | 13~23 | 10.1 | 2.0 | 2.5 |
| 14:1 Myristoleic | | | | | | | 3.0 |
| 16:0 Palmitic | 26.0 | 32~59 | 6.5~11 | 4.2~12 | 25.0 | 27.1 | 27.0 |
| 16:1 Palmitoleic | 0.3 | <0.6 | 1.3~3.5 | 1.0~4.7 | 2.6 | 4.0 | 10.8 |
| 18:0 Stearic | 34.4 | 1.5~8.0 | 10~23 | 3.4~12 | 12.1 | 11.0 | 7.4 |
| 18:1 Oleic | 34.8 | 27~52 | 0.7~54 | 0.9~3.7 | 27.1 | 44.4 | 47.5 |
| 18:2 Linoleic | 3.0 | 5.0~14 | | | 2.4 | 11.4 | 1.7 |
| 18:3 Linolenic | 0.2 | <1.5 | | | 2.1 | | 1.1 |
| 20:0 Eicosanoic | 1.0 | <1.0 | | | | | |
| 22:0 Docosanoic | 0.2 | | | | | | |

As is apparent from the above tables, the number of carbon atoms of the fatty acids contained in biomass derived from various animal and plant components is about 4~24, and especially, C16 and/or C18 fatty acids are most prevalent. Illustratively, the amount of C16 and/or C18 fatty acids in the fatty acids may be at least about 80 wt %, particularly at least about 85 wt %, and more particularly about 90~99 wt %.

Meanwhile, fatty acids having various numbers of carbon atoms depending on the origin of biomass may be contained. For example, in the case of palm oil, the weight ratio of C16 fatty acid to C18 fatty acid is about 1:1, whereas in the case of soybean oil, the weight ratio of C16 fatty acid to C18 fatty acid is about 1:6.

As mentioned above, the biomass-derived fat component mainly includes triglyceride and fatty acid. Triglyceride is present in the form of three fatty acids being ester-linked to glycerol. As such, the ratio (by weight) of triglyceride to fatty acid in the biomass-derived fat is for example about 100:1~6:1, particularly about 20:1~6:1, more particularly about 10:1~6:1, and may vary depending on the biomass source and is not necessarily limited to the above numerical ranges. More typically, triglyceride may constitute about 90~95 wt % of biomass-derived fat.

Also, the carbon chain of triglyceride is approximately composed of C4~C24, and more typically of C16 and C18. Such triglyceride or some mono- and di-glycerides may be converted into mixed C16 and C18 fatty acids through de-esterification as represented by Scheme 1 below.

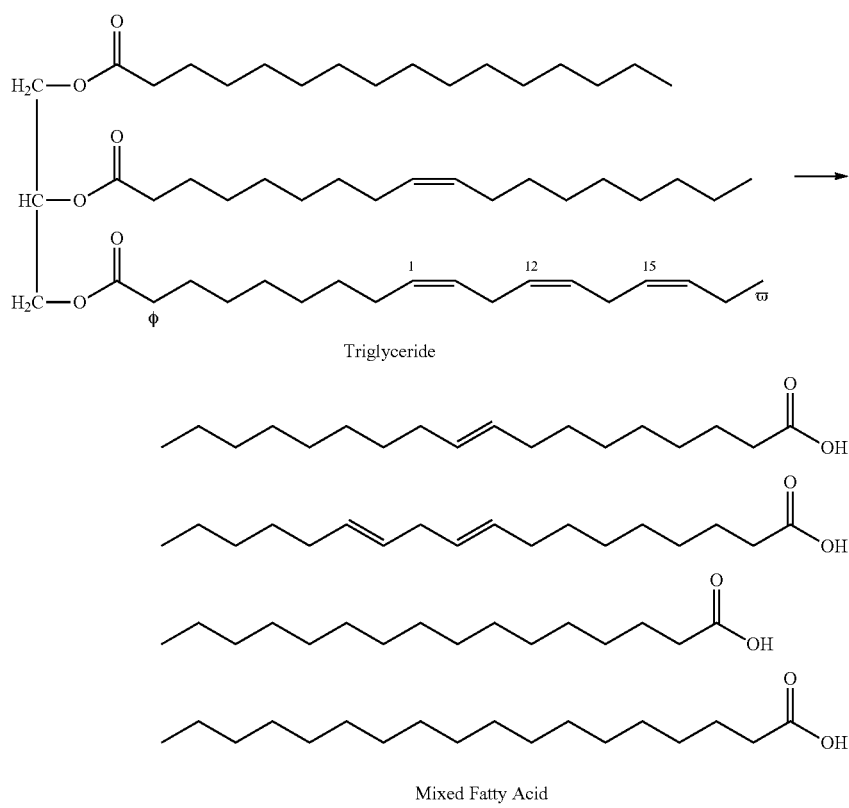

[Scheme 1]

Triglyceride

Mixed Fatty Acid

De-esterification illustrated as above is a typical reaction for preparing FAME (Fatty Acid Methyl Ester) from biomass.

In an exemplary embodiment, de-esterification enables conversion into fatty acid in the presence of a strong acid (e.g. $H_2SO_4$, $HNO_3$, HCl, HBr, HI, $HClO_4$, $HClO_3$, HBrO4, $HBrO_3$, $HIO_4$, $HIO_3$, etc.) or a strong base (e.g. NaOH, KOH, $Ca(OH)_2$, an amine compound, etc.) or steam at high temperature (typically about 100~300° C., more typically about 100~200° C.). In addition, various reactions for converting triglyceride into fatty acid as known in the art may be adopted without particular limitation. Although decarbonylation itself is not greatly affected by the amount of double bond in the feed, the amount of double bond in the mixed fatty acids may be about 80% or less, particularly about 60% or less, and more particularly about 50% or less, based on the total amount of carbon bonds.

In an exemplary embodiment, preparation of biomass-derived fatty acid may further include pre-hydrotreatment (pre-HDT), by which part of the double bonds present in triglyceride (including mono-, di-glycerides) may be saturated, thus adjusting the drilling oil-related characteristics of the mixed olefins resulting from subsequent decarbonylation or improving properties such as oxidation stability. Illustratively, pre-HDT may saturate about 50% or less, particularly about 20% or less, and more particularly about 10% or less of double bonds contained in fatty acids. As will be described later, the case where the number of double bonds in a fatty acid molecule is 2 or more is favorable, and thus pre-HDT conditions need to be adjusted within the proper ranges.

Pre-HDT may be carried out using a HDT catalyst known in the art, and particularly any metal therefor may be selected from among Groups 6, 8, 9, 10, 11 and 12 on the periodic table, and more particularly Pt, Pd, Ni, Fe, Cu, Cr, V, Co, Mo, W, etc. may be used alone or in combination. Also, the above metal component may be used by being supported on an inorganic oxide support, particularly at least one support of alumina, silica, silica-alumina, zirconia, ceria, titania, zeolite (e.g. Y-zeolite (having a silica/alumina molar ratio (SAR) of about 12 or more), clay, SAPO and AlPO. Moreover, pre-HDT may be performed under conditions of a reaction temperature of about 150~350° C. (more particularly about 250~270° C.), a $H_2$ pressure of about 5~180 bar (more particularly about 20~100 bar), and GOR ($H_2$/feed ratio) of about 10~5000 $Nm^3/m^3$ (more particularly about 300~1000 $Nm^3/m^3$). Also in a continuous mode (e.g. using a CSTR reactor), a space velocity (WHSV) may be about 0.01~20 $hr^{-1}$, particularly about 0.05~5 hr', and more particularly about 0.1~1 $hr^{-1}$.

As for fatty acid preparation through Scheme 1, the selection of the biomass feed is regarded as important. Although any biomass fat may be applied in the present embodiment, CPO (Crude palm oil) and SBO (Soybean oil) may be adopted as the biomass feed in terms of industrially applicable amounts, production markets, and stable price volatility. Such a biomass feed is produced in an amount of hundreds of tons per year, of which the amount purchasable on the open market is about one hundred tons or more, and thus an industrially applicable amount may be stably ensured. In the case of the above feed, triglyceride of the fat is composed mainly of C16 and C18 carbon chains. For example, a C16/C18 ratio is about 1 in CPO, and is about 0.25 in SBO. In order to apply the above feed to specific uses (e.g. processed food, cosmetic ingredients, etc.), only triglyceride may be selectively separated. The material remaining after separation is a fatty acid distillate composed mostly of fatty acid (typically comprising about 90% or more of fatty acid). Accordingly, the material other than RBD (refined, bleached, deodorized) palm oil corresponding to triglyceride of CPO may be referred to as PFAD (Palm Fatty Acid Distillate) and the material other than triglyceride of SBO may be referred to as SFAD (Soy Fatty Acid Distillate). Such a fatty acid distillate is conventionally regarded as a byproduct generated in the course of refining triglyceride, and its end use is limited and thus it is traded relatively cheaply. In the case where such a cheap fatty acid distillate is used in the present embodiment, it may be immediately applied to subsequent decarbonylation without a pre-reaction such as de-esterification of triglyceride.

Like this, the mixed fatty acids used for subsequent decarbonylation may include fatty acids converted from triglyceride, fatty acid distillate (fatty acid already contained in biomass fat) or mixtures thereof.

Decarbonylation

According to an embodiment of the present invention, decarbonylation plays a role in converting mixed biomass-derived C16 and C18 fatty acids into mixed C15 and C17 linear olefins.

A reaction mechanism for converting a fatty acid into an olefin by decarbonylation is known in the chemical field. Generally, an olefin, in which the number of carbon atoms is lower by 1 than that of a carbon chain of a fatty acid, is formed by decarbonylation. Specifically, because decarbonylation enables oxygen contained in a fatty acid molecule to be removed in the form of carbon monoxide (CO), the number of carbon atoms of the olefin product is lower by 1 than that of the initial fatty acid. Therefore, taking into consideration the number of carbon atoms of the biomass-derived fatty acid being about 4~24, the number of carbon atoms in the mixed olefins produced by decarbonylation may be about 3~23.

In an exemplary embodiment, because the fatty acids of biomass-derived fat are mainly C16 and C18 fatty acids (in linear fatty acid form), the resulting mixed olefins (i.e. a decarbonylation product) have C15 and C17, and are actually provided in the form of a mixture of linear olefins. Like this, the drilling oil composed mainly of mixed C15 and C17 (linear) olefins exhibits the composition properties derived from biomass (in this regard, an oligomerization product of ethylene is in linear form but has an even number of carbon atoms, while a polymerization product of the other olefin contain a branched olefin). The boiling point of the drilling oil is typically about 250~330° C., and more typically about 270~310° C. Especially, the drilling oil substantially comprising C15 and C17 linear olefins has a boiling point of about 270~310° C.

The composition properties such as C15/C17 olefin content in the drilling oil, etc. may vary depending on the origin of biomass. The amount of the mixed C15 and C17 linear olefins in the drilling oil is typically at least about 80 wt %, particularly at least about 90 wt %, and more particularly at least about 95 wt %. As such, the remainder components of the drilling oil may include olefins other than C15/C17 linear olefins, and small amounts of aromatics, naphthene, paraffin, glyceride (mono-, di-, triglyceride), etc. Furthermore, the drilling oil may be composed substantially of the mixed C15 and C17 linear olefins.

In an embodiment, so long as an olefin (i.e. a double bond) may be produced from a fatty acid through decarbonylation, any type of catalyst system (especially a metal catalyst system) may be used. For example, a transition metal chelate catalyst may be employed. The transition metal may include, for example, Groups 8 to 11 metals on the periodic table, and more particularly may be exemplified by Pd, Rh, Ir, Cu, Fe, etc. Also, a ligand which is a chelating agent may include a phosphorus-based ligand, especially a phosphine-based ligand. Specific examples of the phosphine-based ligand may include triphenylphosphine, diphenylphosphine-C4~7 paraffin, etc. The amount of the ligand may be set to, for example, about 1~50 mol, particularly about 1~20 mol, and more particularly about 1~10 mol per 1 mol transition metal in the catalyst. Also, in order to increase decarbonylation activity or to control the position of double bond in the olefin product, CO and/or halogen (especially, Cl, etc.) may be additionally introduced as the chelating agent to the catalyst.

The olefin production mechanism by decarbonylation of carboxylic acid in the presence of a metal chelate catalyst may be illustratively represented in Scheme 2 below.

[Scheme 2]

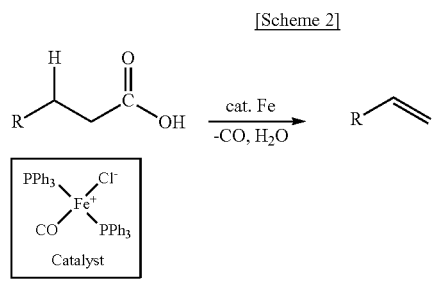

In this reaction, in order to continuously carry out decarbonylation, produced $H_2O$ is removed, and in order to induce polycondensation of fatty acid, an acid anhydride may be selectively added to the reaction system. Typical examples of the acid anhydride may include acetic anhydride ($Ac_2O$), propionic anhydride, etc. The acid anhydride may be used in an amount of up to about 50 mol, particularly about 2~20 mol, and more particularly about 2~10 mol per 1 mol fatty acid. In an exemplary embodiment, the acid anhydride may be introduced into the reaction system in a CO or $N_2$ atmosphere.

Decarbonylation may be performed at about 120~400° C. (particularly, about 150~300° C., more particularly about 180~280° C.) at a pressure of about 150 bar or less (particularly, about 100 bar or less, more particularly about 1~90 bar). More specifically, the reaction may be carried out in a batch or continuous mode, and a batch mode is favorable in terms of simplicity.

As the decarbonylation feed, the mixed fatty acids contain, as the fatty acid which is derived from triglyceride or is already present, a predetermined amount of unsaturated fatty acid having a double bond in a molecular structure. In this case, the reaction may be carried out at a relatively lower temperature compared to decarbonylation for only saturated fatty acid.

Figure 3:
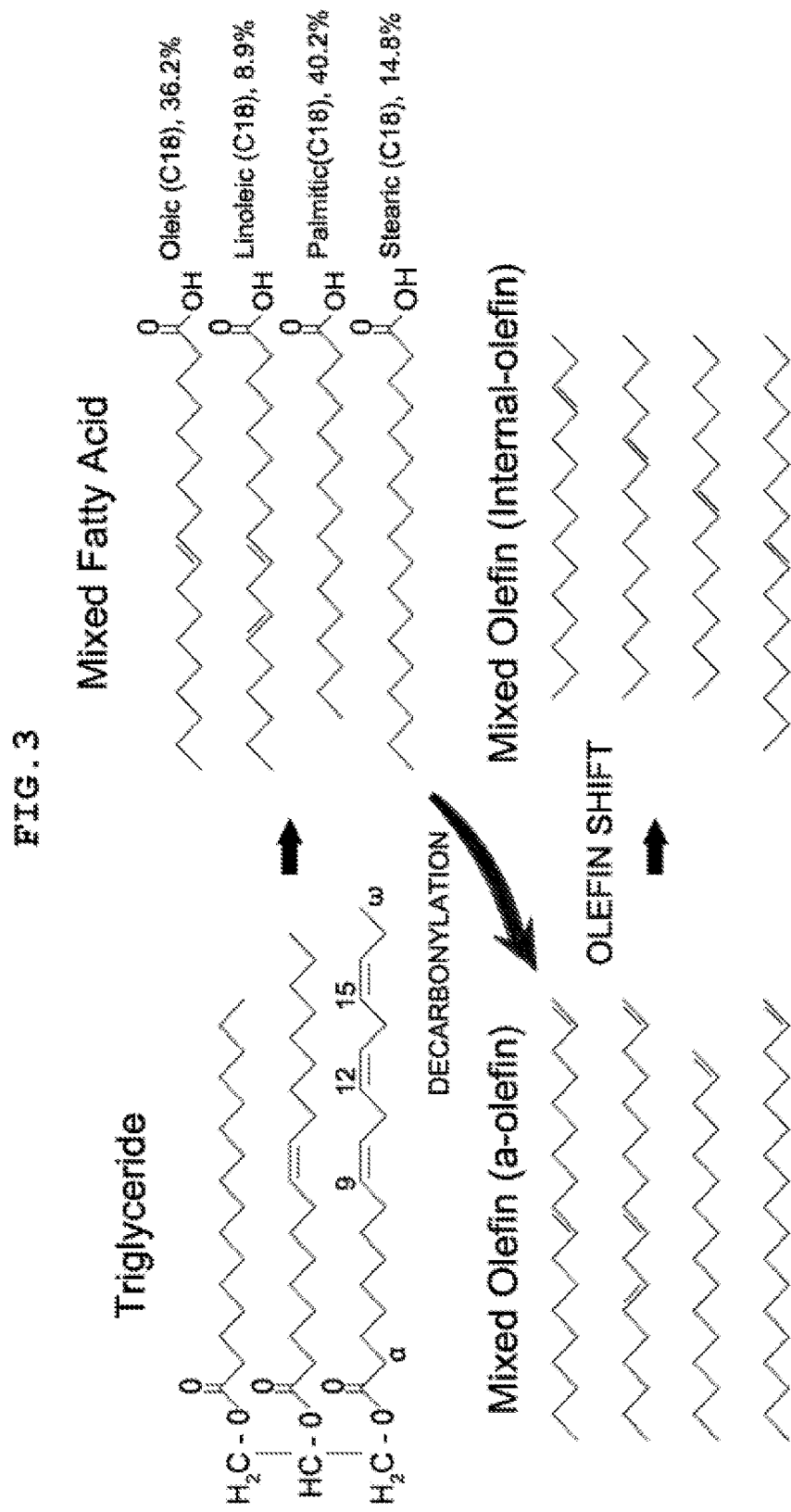
FIG. 3 illustrates a reaction route (including double bond shift in olefin) for preparing mixed olefins through decarbonylation of mixed C16 and C18 fatty acids converted from triglyceride according to an exemplary embodiment of the present invention.

FIG. 3 shows the reaction route (including double bond shift in the mixed olefins) for preparing mixed olefins through decarbonylation of mixed fatty acids converted from triglyceride in an exemplary embodiment of the present invention.

In this reaction mechanism, the olefins converted from the mixed C16 and C18 fatty acids are mixed C15 and C17 linear olefins. As such, the ratio of C15 linear olefin to C17 linear olefin may vary depending on the origin of biomass. For example, the weight ratio of C15 linear olefin to C17 linear olefin may be about 99:1~about 1:99, particularly about 80:20~about 20:80, and more particularly about 70:30~about 30:70, and in some cases, may be about 50:50.

Upon decarbonylation, it is noted that the position of the double bond in the resulting mixed olefins has a significant influence on the characteristics of final lube oil. As illustrated in FIG. 3, as a result of decarbonylation of the mixed fatty acids, the double bond is formed at position of the olefin product in the reaction mechanism, but may be shifted to the center of the carbon chain depending on the reaction conditions, and thus internal olefin may result (in some cases, the double bond which is already present in the fatty acid may be shifted).

Particularly in the case where decarbonylation is performed under reaction conditions of lower temperature and shorter reaction time, selectivity to α-olefin in the produced olefin may increase. Whereas, when decarbonylation is carried out under reaction conditions of higher temperature and longer reaction time, the amount of internal olefin may increase. Actually, the double bond at α-position in the olefin produced at a reaction temperature of, for example, about 240° C. upon decarbonylation is shifted, thus forming internal olefin. As such, the amount of α-olefin in the mixed olefins may theoretically variously change in the range of 0~100 wt %.

Of C15/C17 linear olefins, internal olefin has a tendency of lowering the pour point of drilling oil. Hence, the weight ratio of internal olefin (LIO) relative to the sum of α-olefin (LAO) and internal olefin (LIO) of the mixed C15/C17 linear olefins may be adjusted to at least about 0.1, particularly about 0.2~0.8, and more particularly 0.4~0.7. This range is merely illustrative, and the weight ratio of internal olefin (LIO) relative to the sum of α-olefin (LAO) and internal olefin (LIO) may be increased up to 1 depending on the reaction conditions.

In an exemplary embodiment, the temperature for decarbonylation may be set to about 250° C. or less, and particularly about 240° C. or less depending on the characteristics of the fatty acid. Also, in the case of fatty acid distillate such as PFAD, the reaction may be carried out at about 180~300° C. The reaction time in a batch mode may be for example about 1~600 min, particularly about 1~180 min, and more particularly about 1~60 min. In a continuous mode, the space velocity may be set to, for example, about 0.01~20 hr¹, particularly about 0.05~5 hr¹, and more particularly about 0.1~1 hr¹. Depending on the composition of biomass fat, the decarbonylation conditions may be appropriately adjusted, thus achieving the desired ratio of α-olefin and internal olefin.

Meanwhile, the mixed C15 and C17 linear olefins may contain a polyolefin having two or more double bonds. Such a polyolefin is contained in the fatty acid derived from biomass fat. In the case where pre-HDT is performed before decarbonylation as mentioned above, the amount of the polyolefin may decrease. In the mixed C15 and C17 linear olefins of the drilling oil, the C17 linear olefin contains a polyolefin in a comparatively large amount (e.g. at least about 40 wt %, and particularly about 70 wt % or more based on the C17 linear olefin, and in some cases, 80 wt % or more). A polyolefin functions to decrease the pour point of the drilling oil along with internal olefin, and is biodegradable even under non-aerobic conditions. In an exemplary embodiment, the amount of linear polyolefin in the mixed C15 and C17 linear olefins is at least 10 wt %, particularly about 20~70 wt %, and more particularly about 30~50 wt %.

In the present embodiment, the mixed C15 and C17 linear olefins thus produced may be used as the drilling oil. In some cases, with the goal of increasing the amount of the C15 and C17 linear olefins in the drilling oil, separation or refining (e.g. distillation, extraction, etc.) may be implemented.

In another embodiment, the C15 linear olefin and the C17 linear olefin in the mixed C15/C17 linear olefins are separated from each other, and thus each may be used as the drilling oil. In this regard, the C15 linear olefin has a boiling point of about 270° C., and the C17 linear olefin has a boiling point of about 310° C. In some cases, separating the C15 linear olefin and the C17 linear olefin from each other using such a difference in boiling point is optionally performed, and thus the drilling oil containing linear olefin alone, not the mixture, may be produced.

In an alternative embodiment, the C16 fatty acid and the C18 fatty acid are individually separated from the mixed C16 and C18 fatty acids, after which the C16 or C18 fatty acid is converted into a C15 linear olefin or C17 olefin by decarbonylation. In this embodiment, the drilling oil may include the C15 linear olefin or C17 linear olefin alone produced by decarbonylation of the C16 fatty acid or C18 fatty acid. The C16 fatty acid and the C18 fatty acid may be separated from each other using a typical method (e.g. distillation at different boiling points). The subsequent decarbonylation conditions are as mentioned above.

The C15 linear olefin or the C17 linear olefin may exhibit characteristics suitable for the drilling oil as mentioned above, and may satisfy characteristics of the drilling oil shown in the present embodiment as will be described later.

The drilling oil according to the present embodiment may satisfy all of the properties required of conventional drilling oil, and may also show properties illustrated in Table 4 below.

TABLE 4

| Properties | Range |
| --- | --- |
| Flash point | About 85° C. or more |
| Pour point | Less than about −5° C. |
| Density (g/cm$^3$) | About 0.77~0.81 |
| Kinematic viscosity (cSt; 40° C.) | About 1.9~3.5 |
| Aromatic (wt %) | About 5 wt % or less (particularly 2 wt % or less, more particularly substantially free) |
| Other impurities (S, N, transition metal and/or halogen) (wt %) | About 1 wt % or less (particularly about 0.5 wt % or less, more particularly substantially free) |

Moreover, the drilling oil according to the present embodiment is composed of mixed biomass-derived C15/C17 linear olefins, and in some cases, is composed mainly of a C15 or C17 linear olefin (biodegradability increases in proportion to an increase in the amount of olefin). Also, the remainder components (e.g. non-converted components during decarbonylation) contain oxygen, and are thus favorable in terms of biodegradability. Furthermore, the biomass-derived properties, especially the amounts of aromatics and/or other impurities are much lower compared to the conventional oil (e.g. paraffin)-based drilling oil.

A better understanding of the present invention may be obtained via the following examples which are set forth to illustrate, but are not to be construed as limiting the present invention.

Example 1

Conversion of Stearic Acid into C17 Olefin in $N_2$ Atmosphere

Test for verifying whether mixed olefins were produced using C18 stearic acid as a model feed through decarbonylation in an autoclave reactor was performed (feasibility test).

Specifically, 11.38 g of stearic acid was placed in a 50 cc autoclave reactor, added with 0.51 g of $FeCl_2$ anhydride (a catalyst), 4.2 g of triphenylphosphine and 4.08 g of acetic anhydride, and then physically mixed. Subsequently, while the reactor was slowly stirred at 200 rpm, purging was performed two times with $N_2$ at room temperature. Subsequently, the reaction temperature was slowly increased, maintained at 240° C. for 10 min and then shut-down.

After the temperature was lowered, the autoclave reactor was opened, and the mixture of catalyst and reactants and the reaction product remaining in the autoclave were recovered using n-heptane.

The recovered catalyst and the reaction product were filtered, thus separating the catalyst lump from the reaction product. Then, the catalyst was separately stored so as to be re-used, and the filtered reaction product was mixed with 2 L of deionzied water (DI-water), and maintained overnight with stirring. Then, the reaction product was separated from DI-water using a separatory funnel, and the separated reaction product was filtered again using celite powder. The reaction product thus obtained was subjected to vacuum distillation (Spaltrohr HMS 300° C. available from Fischer technology), so that n-heptane was selectively separated from the reaction product, thereby recovering a final reaction product. The conversion efficiency of the recovered reaction product was measured through Simdist analysis, and selectivity of α-olefin in the olefin product and generation of the other side-reactions were evaluated through GC-MS analysis. The results are given in Table 5 below.

Example 2

Conversion of Stearic Acid into C17 Olefin in CO Atmosphere

Decarbonylation of stearic acid was performed in the same manner as in Example 1, with the exception that the reaction atmosphere was changed to CO 5 bar or 20 bar instead of $N_2$ 1 bar. As such, the test was carried out while changing the reaction time to 1 min, 10 min, 1 hr and 3 hr.

Figure 4:
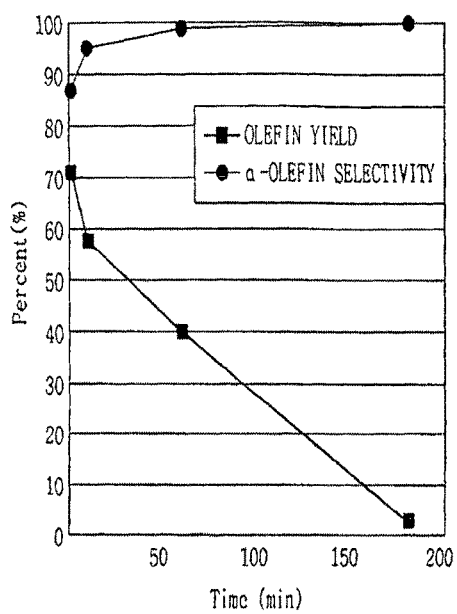
FIG. 4 illustrates the yield of olefin and the selectivity of α-olefin depending on the reaction time, and the yield of olefin and the selectivity of α-olefin depending on the CO pressure, upon decarbonylation of stearic acid in Example 2 of the present invention.
Figure 4:
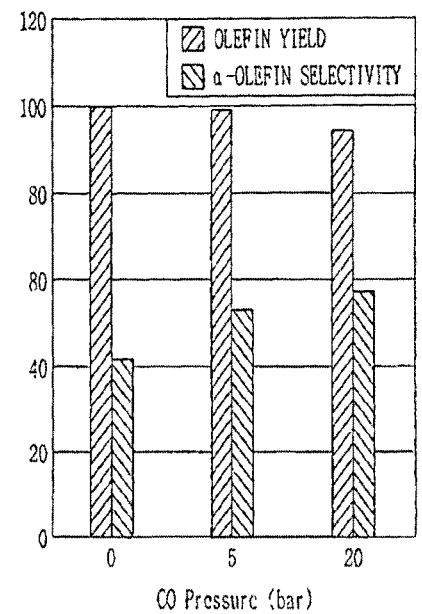

The post-treatment and analysis of the reaction products obtained through the above procedures were performed in the same manner as in Example 1. The results are given in Table 5 below. Also, FIG. 4 illustrates changes in the olefin yield and the selectivity of α-olefin depending on the reaction time, and the olefin yield and the selectivity of α-olefin depending on the CO pressure.

TABLE 5

| Properties | Range |
| --- | --- |
| Flash point | About 85° C. or more |
| Pour point | Less than about −5° C. |
| Density (g/cm$^3$) | About 0.77~0.81 |
| Kinematic viscosity (cSt; 40° C.) | About 1.9~3.5 |
| Aromatic (wt %) | About 5 wt % or less (particularly 2 wt % or less, more particularly substantially free) |
| Other impurities (S, N, transition metal and/or halogen) (wt %) | About 1 wt % or less (particularly about 0.5 wt % or less, more particularly substantially free) |

DPPPent: diphenyl phosphine-pentane

As is apparent from the above table, the decarbonylation activity was high overall. However, the double bond formed at position was shifted to the center of the carbon chain over time. As illustrated in FIG. 4, as the decarbonylation time was longer, the reaction activity (yield) was increased, but the selectivity of α-olefin was decreased. Also, the selectivity of α-olefin could be increased by decreasing the decarbonylation time and increasing the CO pressure. In this case, the total conversion efficiency into olefin was slightly lowered.

On the other hand, in the case where DPPPent (diphenyl phosphine pentane) (Run No. 8) was used as the chelating agent (ligand) instead of TPP (triphenyl phosphine) in the above table, the olefin conversion efficiency was lower despite the reaction for 3 hr, and the selectivity of α-olefin was slightly increased, compared to when using TPP. Based on such test results, the selectivity of α-olefin is considered to be controlled depending on the kind of ligand which is the chelating agent of the catalyst. Briefly, the decarboxylation rate can be controlled by changing the kind of ligand (e.g. the use of a different ligand may decrease the total decarbonylation rate but may increase the selectivity of α-olefin).

Example 3

Preparation of Mixed PFAD-Derived C15 and C17 Linear Olefins

Based on the results of feasibility test in Examples 1 and 2, commercialization potential using the actual feed was examined. As such, PFAD (Palm Fatty Acid Distillate) was used as the cheapest feed.

In a 100 cc autoclave reactor (Julabo), 22.76 g of PFAD was placed, sequentially added with 1.01 g of $FeCl_2$ anhydride, 8.39 g of triphenylphosphine and 8.17 g of acetic anhydride and then physically mixed. Purging was performed three times with $N_2$, and $N_2$ was loaded at a pressure of 20 bar and thus the total reaction pressure was set to 20 bar. Thereafter, the temperature was increased to 242~270° C., maintained for 10 min and then shut-down.

The post-treatment and analysis of the reaction products were performed in the same manner as in Example 1. The results are shown in Table 6 below.

TABLE 6

| Run No. | Reaction Temp. (° C.) | Internal Pressure (bar) | Total Yield (%) | C15 linear olefin yield (%) | C17 linear olefin yield (%) | α-olefin:Internal olefin[1] |
|---|---|---|---|---|---|---|
| 1 | 270 | 90 | 17.7 | 8.8 | 8.9 | 38:62 |
| 2 | 265 | 80 | 38.0 | 19.6 | 18.4 | 36:64 |
| 3 | 255 | 70 | 51.2 | 26.5 | 24.7 | 47:53 |
| 4 | 242 | 60 | 42.3 | 21.3 | 21.0 | 50:50 |

[1]the ratio of α-olefin to internal olefin was the area % ratio by GC-MS analysis.

As is apparent from the above table, the greatest olefin yield is considered to result from the optimal reaction time under conditions of a reactor temperature of about 255° C. (pressure 70 bar). The yield of the mixed linear olefins thus obtained was 51.4%. Because CO and $H_2O$ per fatty acid molecule are removed upon decarbonylation, the above yield may correspond to 65% compared to a theoretical yield.

Figure 5:
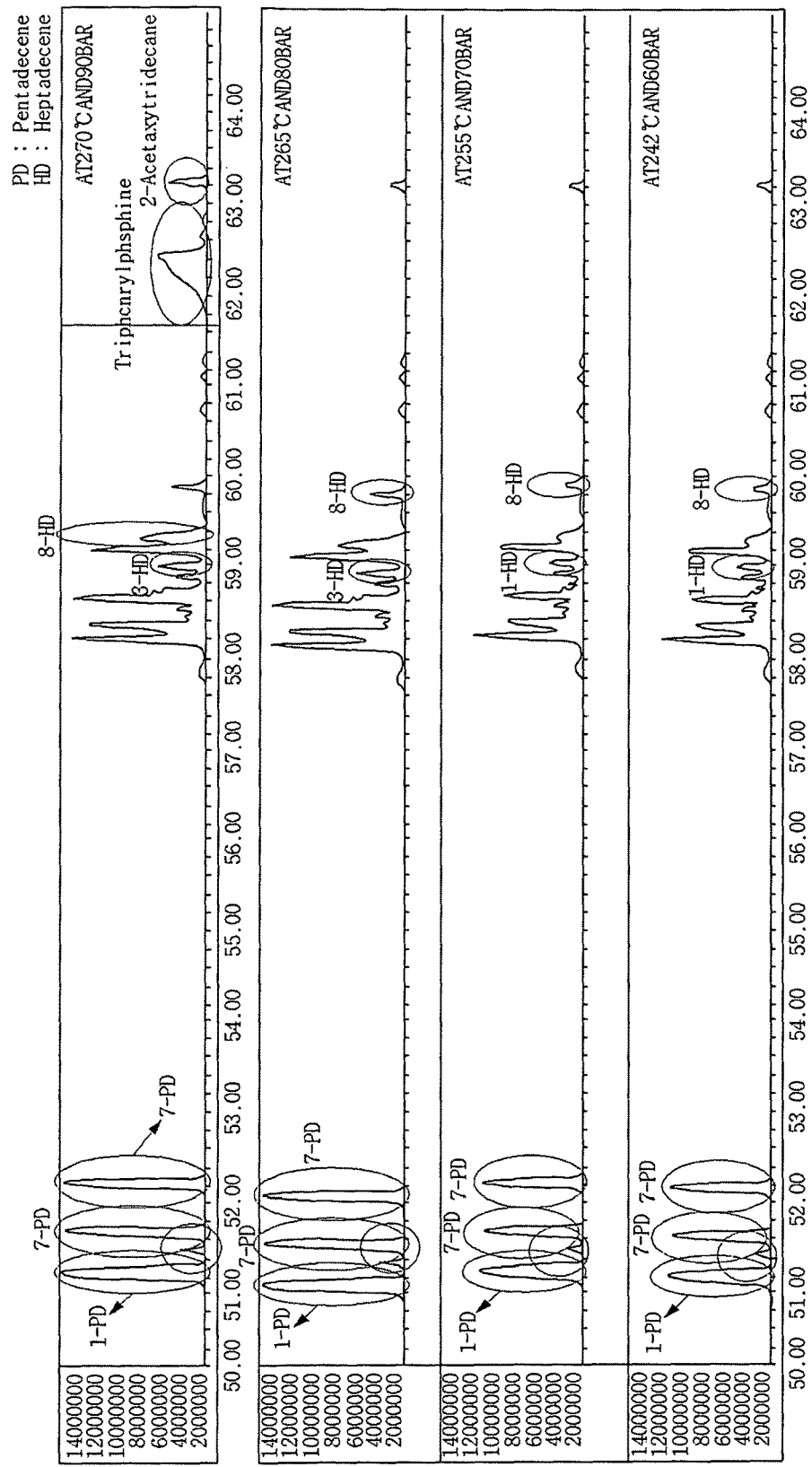
FIG. 5 illustrates GC-MS peak patterns of the mixed C15/C17 linear olefins resulting from decarbonylation of PFAD (Palm Fatty Acid Distillate), depending on the reaction temperature in Example 3 of the present invention.

FIG. 5 illustrates GC-MS peak patterns of the mixed C15/C17 linear olefins ensured through the test of Example 3.

Example 4

Preparation of Mixed PFAD-Derived C15 and C17 Linear Olefins in Pilot Scale

Based on the results of model feed test in Examples 1 and 2, commercialization potential using the actual feed was examined. As such, PFAD (Palm Fatty Acid Distillate) was used as the cheapest feed.

In a 4 L autoclave reactor, 455.2 g of PFAD was placed, sequentially added with 20.4 g of $FeCl_2$ anhydride, 168 g of triphenylphosphine and 163.2 g of acetic anhydride and then physically mixed. Purging was performed two times with $N_2$, and $N_2$ was loaded at a pressure of 20 bar and thus the total reaction pressure was set to 20 bar. Thereafter, the temperature was increased to 180~240° C., maintained for 10 min and then shut-down.

The post-treatment and analysis of the reaction products were performed in the same manner as in Example 1. The results are shown in Table 7 below.

TABLE 7

| Run No. | Reaction Temp. (° C.) | Total Yield (%) | C15 linear olefin yield (%) | C17 linear olefin yield (%) | α-olefin:Internal olefin |
|---|---|---|---|---|---|
| 1 | 240 | 54.4 | 31.6 | 22.8 | 0:100 |
| 2 | 200 | 54.0 | 28.8 | 25.2 | 57:43 |
| 3 | 190 | 48.3 | 25.5 | 22.8 | — |
| 4 | 180 | 47.7 | 25.5 | 22.2 | 65:35 |

As is apparent from the above table, as the reaction temperature decreased, the total olefin yield was decreased. Also, the olefin yield up to about 54% was ensured in the actual feed, unlike the model feed. This is a value obtained in the 4 L autoclave, and thus the yield is considered to be able to additionally increase.

As the results of GC-MS analysis, the mixed C15/C17 linear olefins were selectively produced, and side-reactions were seldom generated. In particular, as the reaction temperature decreased, side-reactions were significantly inhibited. The C15 linear olefin derived from a saturated C16 fatty acid had one double bond therein, whereas the C17 linear olefin was composed of a polyolefin having two or more double bonds.

Figure 6:
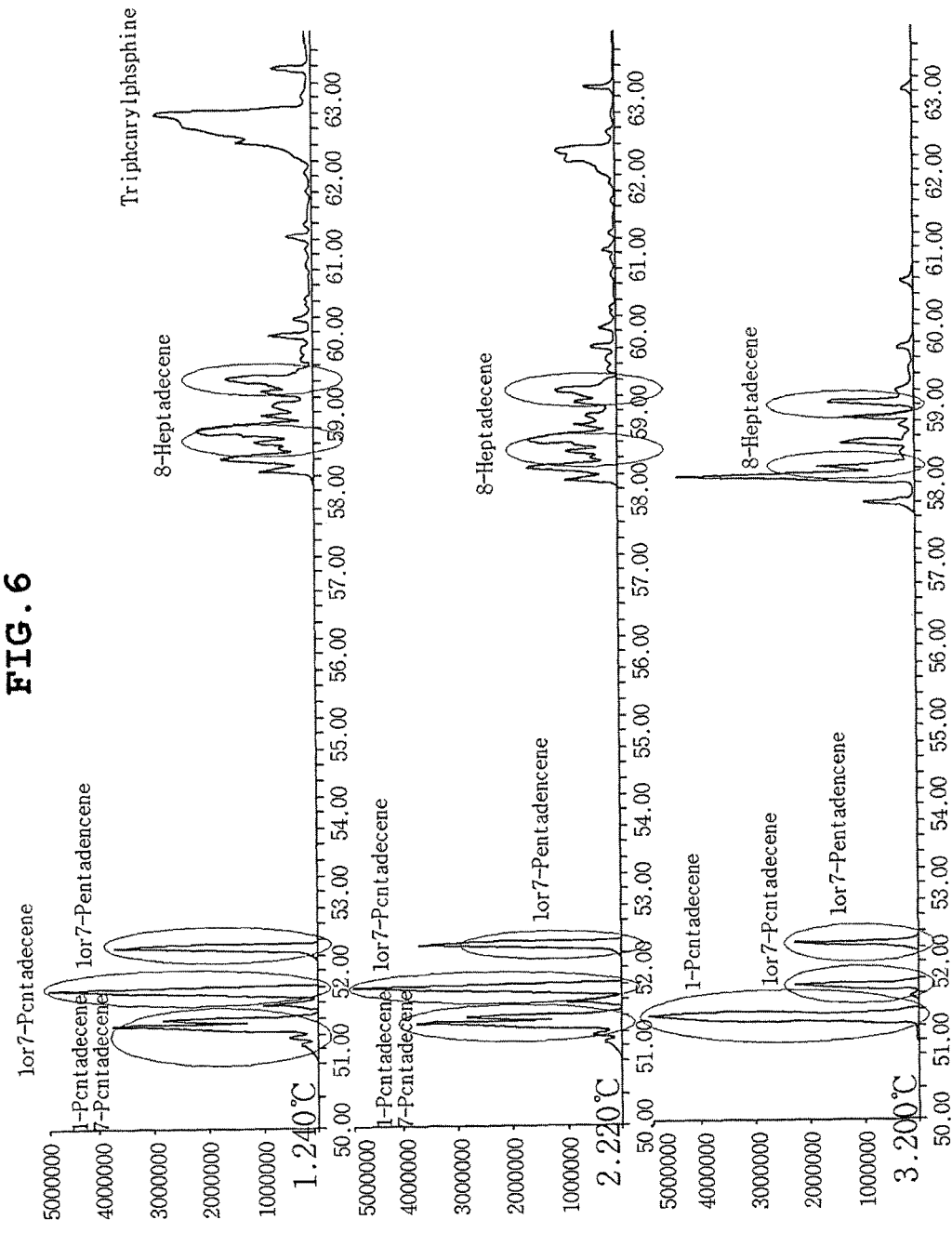
FIG. 6 illustrates GC-MS peak patterns of the mixed C15/C17 linear olefins resulting from decarbonylation of PFAD, depending on the reaction temperature in Example 4 of the present invention.

FIG. 6 illustrates GC-MS peak patterns of the mixed C15/C17 linear olefins obtained by decarbonylation of PFAD in a 4 L autoclave reactor, depending on the reaction temperature. As illustrated in this drawing, as the reaction temperature decreased, the peak of 1-pentadecene as α-olefin was increased. Also, the mixed C15/C17 linear olefins contained not only α-olefin but also internal olefin.

Figure 7:
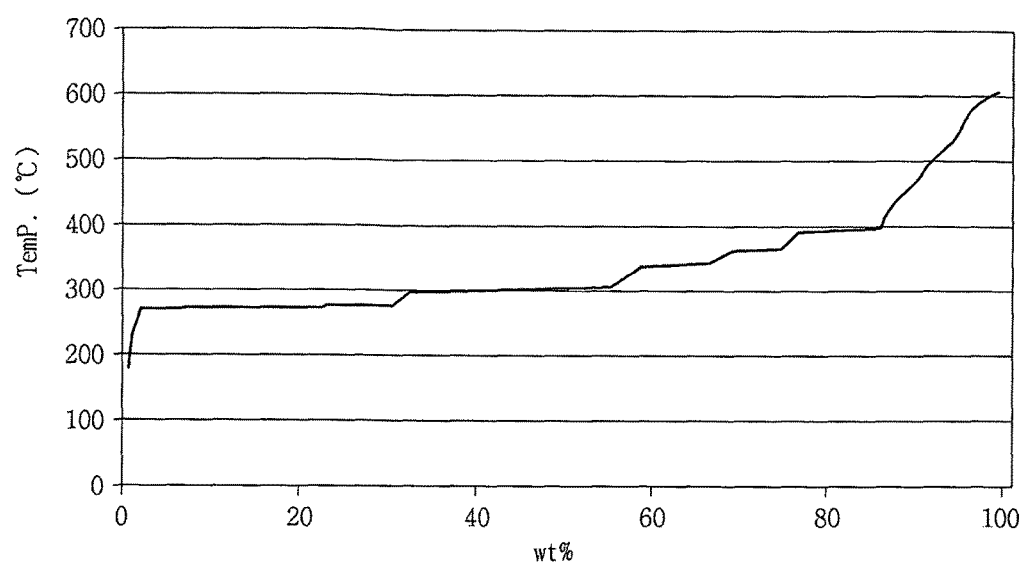
FIG. 7 illustrates the results of Simdist analysis of a liquid product resulting from decarbonylation of PFAD at reaction temperature of 240° C. in Example 4 of the present invention.

In addition, the Simdist pattern of the liquid reaction product by decarbonylation of PFAD at a reaction temperature of 240° C. is illustrated in FIG. 7. The boiling points of the C15/C17 linear olefins were about 270° C. and 300° C., respectively, and the obtained liquid product was subjected to fractional distillation (Spaltrohr HMS 300° C.; Fischer technology) and thus oil fractions having a boiling point of about 260~310° C. were selectively separated, affording mixed C15/C17 linear olefins.

Example 5

Test for Replacement Potential of $FeCl_2$ Anhydride with $FeCl_2$ Hydrate

Whether the same decarbonylation yield could be obtained using cheap $FeCl_2$ hydrate as the catalyst for decarbonylation instead of $FeCl_2$ anhydride was evaluated.

The decarbonylation test was performed under the same conditions as in Example 3, with the exception that 0.40 g of $FeCl_2 4H_2O$ was used in lieu of 1.01 g of $FeCl_2$ anhydride.

The post-treatment and analysis of the reaction products were performed in the same manner as in Example 1. The results are shown in Table 8 below. The GC-MS peak patterns for the decarbonylation products are illustrated in FIG. 8.

TABLE 8

| Run No. | Catalyst | Reaction Temp. (° C.) | Internal Pressure (bar) | Total yield (%) | C15 linear olefin yield (%) | C17 linear olefin yield (%) |
|---|---|---|---|---|---|---|
| 1 | $FeCl_2$ | 255 | 70 | 51.2 | 26.5 | 24.7 |
| 2 | $FeCl_2 4H_2O$ | 255 | 70 | 51.9 | 26.6 | 25.3 |

Figure 8:
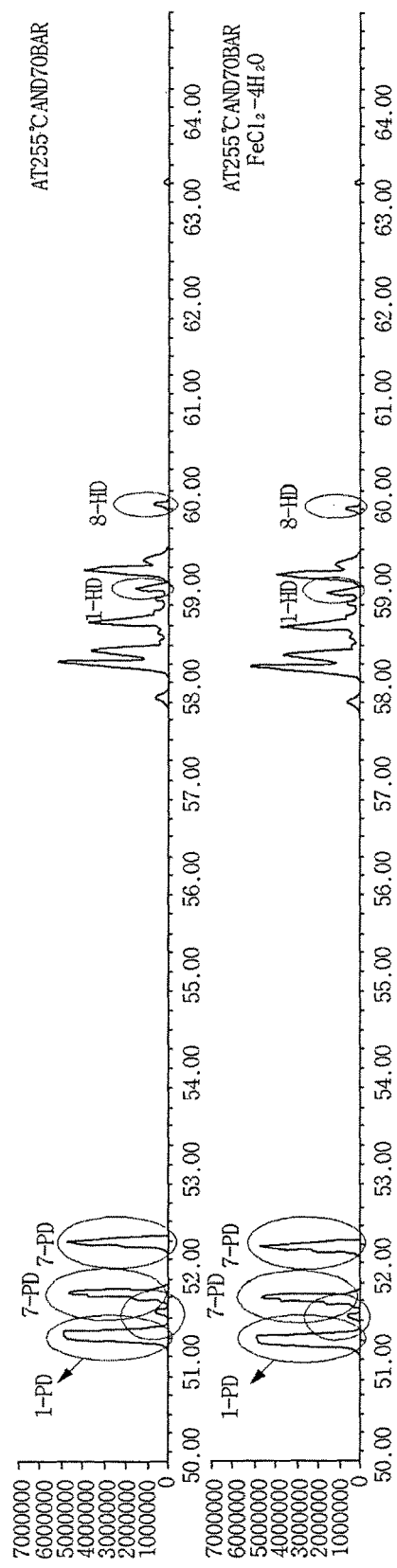
FIG. 8 illustrates GC-MS peak patterns of decarbonylation products in the presence of each of $FeCl_2$ anhydride and $FeCl_2$ hydrate as a decarbonylation catalyst in Example 5 of the present invention.

As is apparent from Table 8 and FIG. 8, there was no difference between the anhydride and the hydrate in terms of the use of the $FeCl_2$ catalyst.

Example 6

Evaluation of Effects of Pre-HDT and CO Introduction in Pilot Scale

When PFAD as the feed was subjected to pre-HDT, changes in the decarbonylation activity were measured. Also, decarbonylation activity was evaluated under CO conditions.

Pre-HDT of PFAD was performed using a $NiMo/ZrO_2$ catalyst in a CSTR reactor. The reaction was carried out under conditions of 200° C., a $H_2$ pressure of 20 bar, WHSV of 0.5 $hr^{-1}$ and GOR of 1000 $Nm^3/m^3$, so that the double bond in the reaction product was selectively removed. As the results of BI analysis of the product after hydrotreatment, almost no double bonds remained.

Decarbonylation of the saturated fatty acid subjected to pre-HDT was conducted. This reaction was carried out under the same reaction conditions as in Example 4. In addition, changes in the yield were evaluated under CO conditions in lieu of $N_2$, and the reaction was implemented under the same reaction conditions as in Example 4, except for the use of CO instead of $N_2$.

The post-treatment and analysis of the reaction products were performed in the same manner as in Example 1. The results are shown in Table 9 below.

TABLE 9

| Run No. | Feed | Reaction Temp. (° C.) | Initial internal pressure | Total yield (%) | C15 linear olefin yield (%) | C17 linear olefin yield (%) |
|---|---|---|---|---|---|---|
| 1 | PFAD Pre-HDT | 180 | $N_2$ 20 bar | 47.1 | 20.1 | 27.0 |
| 2 | PFAD Pre-HDT | 200 | CO 20 bar | 82.2 | 36.4 | 45.8 |
| 3 | PFAD Pre-HDT | 180 | CO 20 bar | 79.2 | 35.3 | 43.9 |

As is apparent from Table 9, pre-HDT had no great influence on the decarbonylation yield. Thus, pre-HDT is considered to be utilized to control the characteristics of the drilling oil without greatly affecting the reaction yield.

In the case where decarbonylation was induced in a CO atmosphere instead of $N_2$, the olefin yield was remarkably increased. This is considered to be because fatty anhydride is linked to the Fe—PPh3 chelate catalyst useful as a catalyst for decarbonylation, and, in the course of separation after decarbonylation, CO functions as a chelating agent of the Fe—PPh3 chelate catalyst, thus increasing the yield. In the mixed olefins obtained after decarbonylation under CO conditions, the ratio of C15 olefin to C17 olefin was not significantly different from the ratio of C16 fatty acid to C18 fatty acid in the PFAD feed. Hence, there is no great difference in the decarbonylation rate between C16 and C18 fatty acids.

Example 7

Evaluation of Application Potential of Mixed C15/C17 Linear Olefins to Drilling Oil Through Analysis of Properties Thereof Whether the mixed C15/C17 linear olefins produced in Example 4 could be used as the drilling oil was evaluated through analysis of the properties thereof. The sample for analysis of the properties of the drilling oil was Run No. 2 in Table 7 comprising the mixed C15/C17 linear olefins (decarbonylation at 200° C.; the weight ratio of α-olefin to internal olefin was about 57:43 (based on GC-MS area %)).

The flash point, pour point, specific gravity, kinematic viscosity (40 C) and aromatic content of the mixed C15/C17 linear olefins were measured. As such, the aromatic content was analyzed using LC. The analytical results are shown in Table 10 below.

TABLE 10

| Analytical items | Minimum standard of present embodiment | Mixed C15/C17 linear olefins |
|---|---|---|
| Flash point (° C.) | 85 or more (higher good) | 110~113 |
| Pour point (° C.) | Less than −5 (lower good) | Less than −15 |
| Specific gravity | 0.77~0.81 | 0.775~0.808 |
| Kinematic viscosity (cSt; 40° C.) | 1.9~3.5 | 1.9~3.5 |
| Aromatic content (wt %) | Less than 5 wt % | No aromatic detection |

As is apparent form the above table, the mixed C15/C17 linear olefins had characteristics adapted for the drilling oil. In addition, the mixed C15/C17 linear olefins are considered to be superior in terms of toxicity and biodegradability compared to conventional oil, especially paraffin-based drilling oil, because they are derived from biomass and contain internal olefin and polyolefin in considerable amounts, which favorably affect biodegradability.

As for analysis of the properties, important considerations are that the characteristics of the drilling oil are affected by the decarbonylation temperature for olefin conversion. In Examples 1 to 4, the position of the double bond in the olefin could be selectively controlled through changes in the decarbonylation conditions. Especially in the case of PFAD, the selectivity of α-olefin varied depending on the decarbonylation temperature, as shown in Example 4. Also, in Example 2, the selectivity of α-olefin was increased in proportion to a decrease in the decarbonylation temperature.

Whether the mixed C15/C17 linear olefins contained aromatics or naphthene was evaluated through LC-aromatics and GC-MS. As a result, aromatics were not detected and byproducts such as naphthene were not contained. In addition, the amount of the sulfur and/or nitrogen compound in the mixed C15/C17 linear olefins was measured using EA-CHONS analysis. Consequently, the amount of impurities was 0.1 wt % or less, from which the hetero atom compound was not substantially contained in the mixed C15/C17 linear olefins.

Accordingly, simple modifications, additions and substitutions of the present invention should also be understood as falling within the scope of the present invention, without departing from the scope and spirit of the invention as disclosed in the accompanying claims.

The invention claimed is:

1. A drilling oil, comprising mixed C15 and C17 linear alpha and internal olefins, wherein a weight ratio of C15 linear olefin to C17 linear olefin is 99:1~1:99,
   a weight ratio of internal olefin (LIO) relative to a sum of C15 and C17 α-olefin (LAO) and internal olefin (LIO) of the mixed C15 and C17 linear olefins is at least 0.1,
   the mixed C15 and C17 linear olefins contain at least 10 wt % of a polyolefin having two or more double bonds, and
   the drilling oil has (i) a flash point of 85° C., or more, (ii) a pour point of less than −5° C., (iii) a density of 0.77~0.81 g/cm$^3$, and (iv) a kinematic viscosity of 1.9~3.5 cSt (40° C.).

2. The drilling oil of claim 1, wherein an amount of the mixed C15 and C17 linear olefins in the drilling oil is at least 80 wt %.

3. The drilling oil of claim 1, wherein the drilling oil contains 5 wt % or less of an aromatic compound.

4. The drilling oil of claim 1, wherein the drilling oil has a boiling point of 250~330° C.

5. The drilling oil of claim 1, wherein the drilling oil has (i) the flash point of 110~113° C., (ii) the pour point of less than −15° C., (iii) the density of 0.775~0.808 g/cm$^3$, and (iv) the kinematic viscosity of 1.9~3.5 cSt (40° C.).

* * * * *